(12) United States Patent
Eshwar et al.

(10) Patent No.: US 8,498,998 B2
(45) Date of Patent: *Jul. 30, 2013

(54) GROUPING IDENTITY RECORDS TO GENERATE CANDIDATE LISTS TO USE IN AN ENTITY AND RELATIONSHIP RESOLUTION PROCESS

(75) Inventors: Bhavani K. Eshwar, Karnataka (IN); Rajeshwar Kalakuntla, Siddipet (IN); Vaishnavi Nori, Hyderabad (IN); Nithinkrishna Shenoy, Mangalore (IN)

(73) Assignee: International Business Machines Corporation, Armonk, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/902,057

(22) Filed: Oct. 11, 2010

(65) Prior Publication Data

US 2012/0089606 A1 Apr. 12, 2012

(51) Int. Cl.
G06F 7/00 (2006.01)
(52) U.S. Cl.
USPC .......................................... 707/765; 707/773
(58) Field of Classification Search
USPC .......................................... 707/737, 765, 773
See application file for complete search history.

(56) References Cited

U.S. PATENT DOCUMENTS

| | | | |
|---|---|---|---|
| 7,333,951 B1 | 2/2008 | Corning et al. | |
| 7,467,131 B1 * | 12/2008 | Gharachorloo et al. | 1/1 |
| 2004/0210763 A1 | 10/2004 | Jonas | |
| 2005/0102210 A1 * | 5/2005 | Song et al. | 705/35 |
| 2006/0149674 A1 * | 7/2006 | Cook et al. | 705/44 |
| 2008/0027893 A1 | 1/2008 | Cavestro et al. | |
| 2008/0072138 A1 | 3/2008 | Cragun et al. | |
| 2008/0319978 A1 | 12/2008 | Brun et al. | |
| 2009/0006369 A1 | 1/2009 | Guday et al. | |
| 2009/0182755 A1 | 7/2009 | Adair et al. | |
| 2009/0198678 A1 | 8/2009 | Conrad et al. | |
| 2009/0271348 A1 | 10/2009 | Allen et al. | |
| 2009/0271394 A1 | 10/2009 | Allen et al. | |
| 2009/0271862 A1 | 10/2009 | Allen et al. | |
| 2010/0161542 A1 | 6/2010 | Caceres | |
| 2010/0161603 A1 | 6/2010 | Caceres | |
| 2010/0161634 A1 | 6/2010 | Caceres | |

OTHER PUBLICATIONS

Friedrich, A., "IBM DB2 Anonymous Resolution: Knowledge Discovery Without Knowledge Disclosure", IBM DB2 Anonymous Resolution Whitepaper, May 2005, 23 pp.

(Continued)

*Primary Examiner* — Amy Ng
(74) *Attorney, Agent, or Firm* — David W. Victor; Konrad, Raynes, Davda & Victor LLP

(57) ABSTRACT

Provided are a method, system, and computer program product for grouping identity records to generate candidate lists to use in an entity and relationship resolution process. Identity records provide attributes of entities and are grouped into a group of identity records. A composite query on values for selected attributes of the identity records in the group is generated and applied to an entity database to obtain composite results of entity records in the entity database. For the identity records in the group, an individual query on attributes of one of the identity records is performed against the composite results of the entity records to determine a candidate list of entity records. Resolution rules are applied to determine entity records in the determined candidate list related to one of the identity records in the group according to the resolution rules.

17 Claims, 6 Drawing Sheets

OTHER PUBLICATIONS

IBM Corporation, "IBM Relationship Resolution: Installation and Configuration Guide", First Edition, © 2003, 2007, 84 pp.

IBM Corporation, "Overview of IBM Relationship Resolution", Relationship Resolution Information Center, Version 4.2, [online], Updated 2009, [Retrieved on Sep. 1, 2010], retrieved from the Internet at <URL: http://publib.boulder.ibm.com/infocenter/easrr/v4r2m0/topic/com.ibm.eas...>, 2 pp.

Wikipedia, "Identity Resolution", [online], Modified Jun. 30, 2010, [Retrieved Sep. 1, 2010], Retrieved from the Internet at <URL: http://en.wikipedia.org/w/index.php?title=Identity_resolution&printable=yes>, 2 pp.

U.S. Appl. No. 13/451,270, filed Apr. 19, 2012, entitled "Grouping Identity Records to Generate Candidate Lists to Use in an Entity and Relationship Resolution Process" invented by Eshwar, B.K., R. Kalakuntla, V. Nori, and N.P. Shenoy, Total 27 pp. [57.229C1 (Appln)].

Notice of Allowance 1, Jan. 4, 2013, for U.S. Appl. No. 13/451,270, filed Apr. 19, 2012 by B.K. Eshwar et al., Total 9 pp. [57.229C1 (NOA1)].

Amendment 1, Dec. 12, 2012, for U.S. Appl. No. 13/451,270, filed Apr. 19, 2012 by B.K. Eshwar et al., Total 8 pp. [57.229C1 (Amend1)].

Office Action 1, Sep. 12, 2012, for U.S. Appl. No. 13/451,270, filed Apr. 19, 2012 by B.K. Eshwar et al., Total 19 pp. [57229C1 (OA1)].

Notice of Allowance 1, Jan. 4, 2013, for U.S. Appl. No. 13/451,270, filed Apr. 19, 2012 by B.K. Eshwar et al., Total 9 pp. [57.22901 (NOA1)].

Bilenko, M., B. Kamath, and R.J. Mooney, "Adaptive Blocking: Learning to Scale Up Record Linkage", Proceedings of the WWW-2006 Workshop on Information Integration on the Web (IIWeb-2006), May 2006, Total 6 pp.

Notice of Allowance 2, Apr. 8, 2013, for U.S. Appl. No. 13/451,270, filed Apr. 19, 2012 by B.K. Eshwar et al., Total 8 pp. [57.229C1 (NOA2)].

* cited by examiner

US 8,498,998 B2

GROUPING IDENTITY RECORDS TO GENERATE CANDIDATE LISTS TO USE IN AN ENTITY AND RELATIONSHIP RESOLUTION PROCESS

BACKGROUND OF THE INVENTION

1. Field of the Invention

The present invention relates to a method, system, and computer program product for grouping identity records to generate candidate lists to use in an entity and relationship resolution process.

2. Description of the Related Art

Identity resolution, also known as entity resolution, is an operational intelligence process, typically powered by an identity resolution engine or middleware stack, to allow organizations to connect disparate data sources with a view to understanding possible identity matches and non-obvious relationships across multiple data silos. The identity resolution process analyzes all of the information relating to individuals and/or entities from multiple sources of data, and then applies likelihood and probability scoring to determine which identities are a match and what, if any, non-obvious relationships exist between those identities. This allows organizations to solve business problems related to recognizing the true identity of someone or something ("who is who") and determining the potential value or danger of relationships ("who knows who") among customers, employees, vendors, and other external forces. It also provides immediate and actionable information to help prevent threat, fraud, abuse, and collusion in all industries.

When a record corresponding to a particular person is fed as the input to this entity resolution engine, a candidate list of entities which may possibly be connected to the person depicted in the incoming record is generated. After the list of candidates is generated, each of these candidates are checked for any kind of relationships that may exist between them and the incoming record. Subsequently entity resolution (who is who) and relationship resolution (who knows who) will be done.

Candidate lists are the lists of entities that have the potential to match the incoming identity record. The candidate list is built by retrieving those entities that share attributes with the incoming identity, based on the attributes that are specified in the candidate builder configuration. The current scheme of candidate list generation processes the input records one-by-one. For each and every record, to generate the candidate list, the database has to be queried each time depending on the attributes of the incoming record. This constant querying of the database affects the performance of the system. Thus, if there are 'N' input records which are being fed into the engine, the task of querying the database has to be done 'N' times.

After the candidate list is generated, the entity resolution process compares the incoming identity to the first candidate on the list using the configured resolution rules. The system uses the resolution rules, in order, to compute a resolution score that represents how closely the incoming identity attributes match the attributes of the candidate entity. If the incoming identity attributes meet or exceed the resolution score for that rule, the incoming identity record is resolved into the candidate entity.

If the resolution score does not meet or exceed the resolution score set for that resolution rule, the system goes to the next resolution rule until the incoming identity record has been resolved into a candidate entity or all resolution rules have been exhausted. If the incoming identity record is not resolved into an existing entity, the system resolves the record into a new entity and stores the new entity in the entity database. After the entity resolution has been performed, the results have to be logged to the database each time again one-by-one.

SUMMARY

Provided are a method, system, and computer program product for grouping identity records to generate candidate lists to use in an entity and relationship resolution process. A plurality of identity records are received, wherein the identity records provide attributes of entities, wherein the identity records may provide different or same values for the attributes. The received identity records are grouped into a group of identity records. A composite query on values for selected attributes of the identity records in the group is generated and applied to an entity database to obtain composite results of entity records in the entity database matching the attribute values of the composite query. For the identity records in the group, an individual query on attributes of one of the identity records is performed against the composite results of the entity records to determine a candidate list of entity records from the entity database for the identity record. For the identity records in the group, resolution rules are applied to determine entity records in the determined candidate list that are related one of the identity records in the group according to the resolution rules. Entity relationship information on the determined entity records that are related to the identity records is stored.

DETAILED DESCRIPTION

Figure 1:
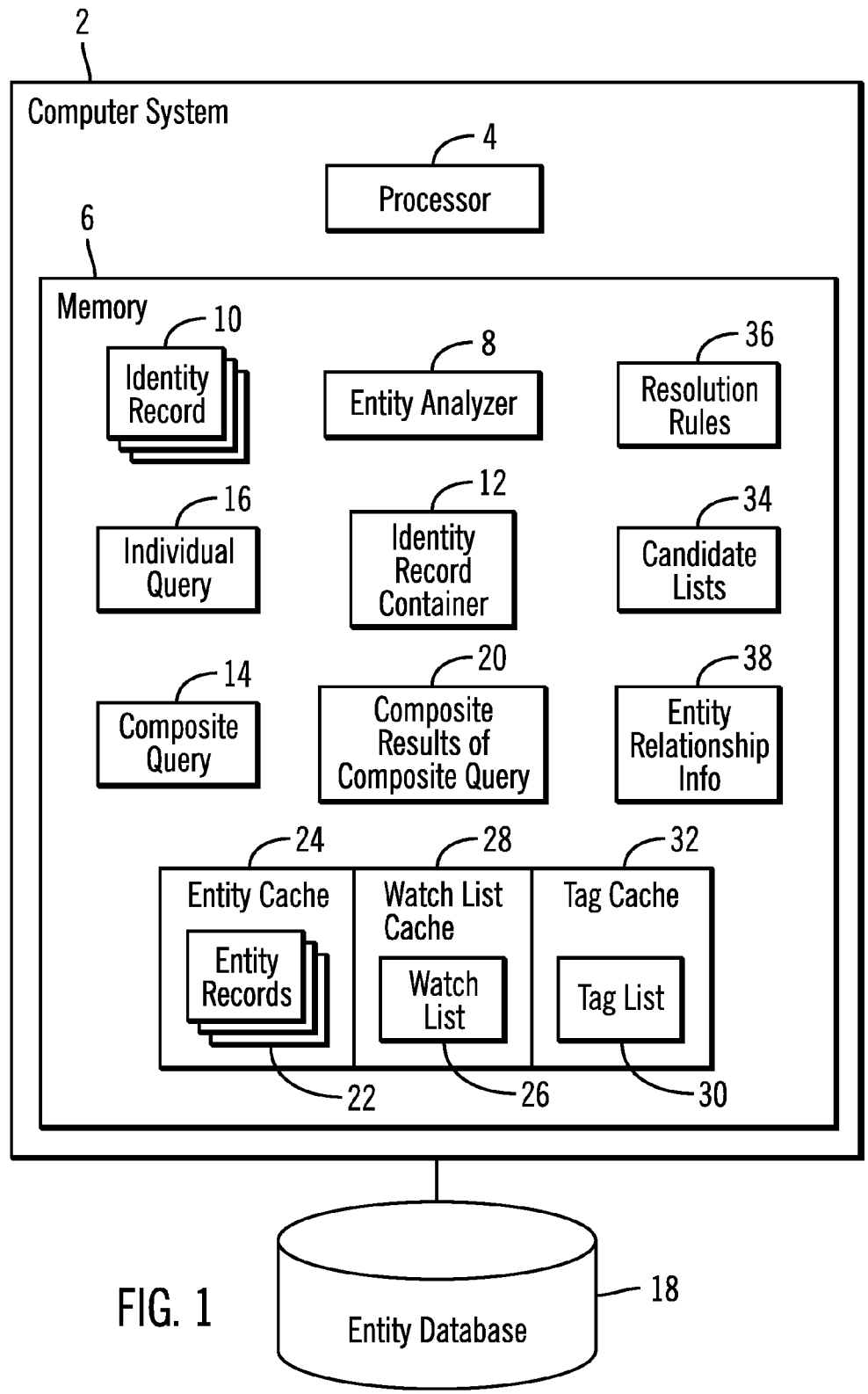
FIG. 1 illustrates an embodiment of an entity resolution computing environment.

FIG. 1 illustrates an embodiment of a computer system 2 including a processor 4 comprising one or more processor devices and a memory 6. The memory 6 may comprise a non-volatile working memory for the processor 4. The processor 4 executes an entity analyzer 8, which analyzes incoming identity records 10 to determine whether to group some or all of the identity records 10 in an identity record container 12. The entity analyzer 8 generates a composite query 14 based on selected attribute values in the identity records 10 for the identity records 10 grouped in the container 12. Separate individual queries 16 are generated for received identity records 10 not grouped in a container. The entity analyzer 8 submits the composite query 14 and the individual queries 16 to an entity database 18 coupled to the system 2 to receive composite results of the composite query 20. The entity records 22 received from the entity database 18 in response to the queries 14 and 16 are cached in an entity cache 24.

The entity analyzer 8 further maintains a watch list 26 in a watch list cache 28 and a tag list 30 in a tag list cache 32. The watch list 26 may comprise a list of people or entities that need to be screened so that an alert may be generated if an incoming identity record 10 matches an entity record on the watch list 26. For instance, the watch list 26 may indicate wanted or dangerous individuals so that the authorities may be alerted if the system processes an incoming identity record 10 matching such a wanted person on the watch list 26. The tag list 30 comprises an additional list of further entities of interest to check against. If an entity on the tag list 30 matches, then an alert may or may not be generated, depending on the resolution rules 36 that are configured.

In certain embodiments, a watch list 26 may comprise a list of entities that are considered dangerous or problematic and the tag list 30 may comprise a list of entities or people to track, that are not necessarily dangerous or problematic as the entities or people on the watch list 26. For example, law enforcement agencies may have unique tags for each of its field agents who are on an assignment and these tags are added to the tag list 30 to track the activities of these agents.

The entity analyzer 8 further generates candidate lists 34 for the identity records 10 having entity records in the entity database 18, the watch list 26, and the tag list 30 that satisfy selected attribute values in the individual query for the identity record for which the list 30 is generated. The entity analyzer 8 would apply resolution rules 36 as part of an entity resolution process that compares the identity record 10 with the entity records in the candidate list 34 generated for the identity record to determine if the identity record 10 is related to the entity records in the list 34. In certain embodiments, the entity analyzer 8 uses the resolution rules 36 to compute a resolution score that represents how closely the incoming identity record 10 attributes match the attributes of the entity records in the candidate list 34 generated for that identity record 10. If the attribute values of the received identity record 10 meet or exceed the resolution score for that rule, then the incoming identity record is resolved to be related to the candidate entity record. The entity analyzer 8 generates entity relationship information 38 for each identity record 10 indicating the entity records in the candidate list 34 that are related to the record according to the applied resolution rules.

The entity analyzer 8 may be implemented as one or more software programs loaded into the memory 6 and executed by the processor 4. In an alternative embodiment, the entity analyzer 8 may be implemented with hardware logic, such as an Application Specific Integrated Circuit (ASIC).

Figure 2:
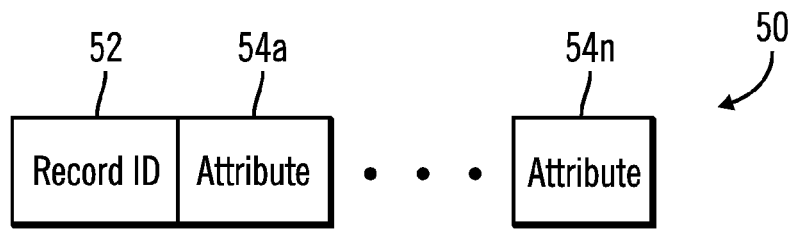
FIG. 2 illustrates an embodiment of an entity or identity record as known in the prior art.

FIG. 2 illustrates an embodiment of a record 50 as known in the prior art, such as a received identity record 10 or entity record in the database 18, watch list 26, and tag list 30 having a record identifier (ID) 52 and values for multiple attributes 54a . . . 54n. For entity and identity records identifying persons, the attributes may indicate name, phone number, identifications, address, appearance, etc.

Figure 3:
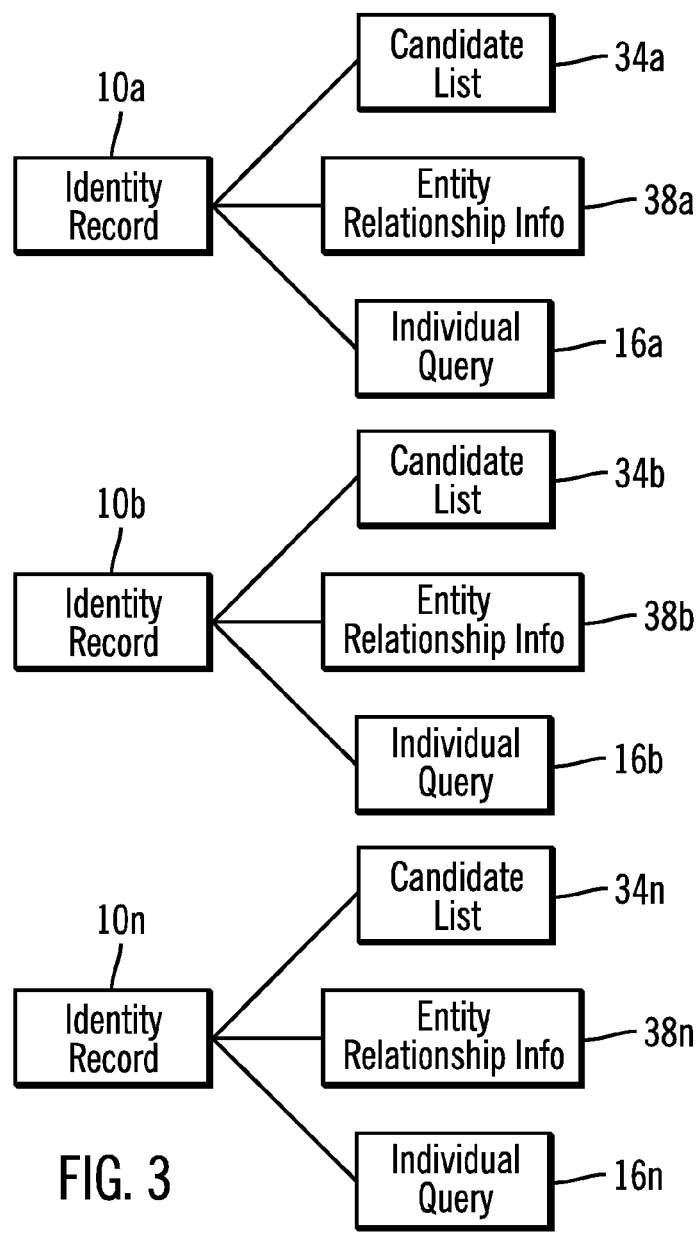
FIG. 3 illustrates an embodiment of a relationship of identity records to elements used in the resolution process.

FIG. 3 illustrates a diagram of how each of received identity records 10a, 10b . . . 10n are associated with a candidate list 34a, 34b . . . 34n having entity records from the entity database 18, the watch list 26, and the tag list 30 that satisfy an individual query 16a, 16b . . . 16n having a query on selected attribute values from the identity record 10a, 10b . . . 10n. The entity analyzer 8 further generates for each identity record 10a, 10b . . . 10n entity relationship information 38a, 38b . . . 38n indicating entity records in the candidate list 34a, 34b . . . 34n that are determined according to resolution rules 36 to be related to the identity record 10a, 10b . . . 10n. The individual query 16a, 16b, 16n for an identity record 10a, 10b . . . 10n grouped in a container 12 is applied to the entity records 22 in the entity cache 24 to determine entity records 22 from the entity database 18 to include in the candidate list 34a, 34b . . . 34n. The individual query 16a, 16b, 16n for an identity record 10a, 10b . . . 10n not grouped in a container 12 is applied to the entity database 18 directory to determine entity records from the entity database 18 to include in the candidate list 34a, 34b . . . 34n.

Figure 4:
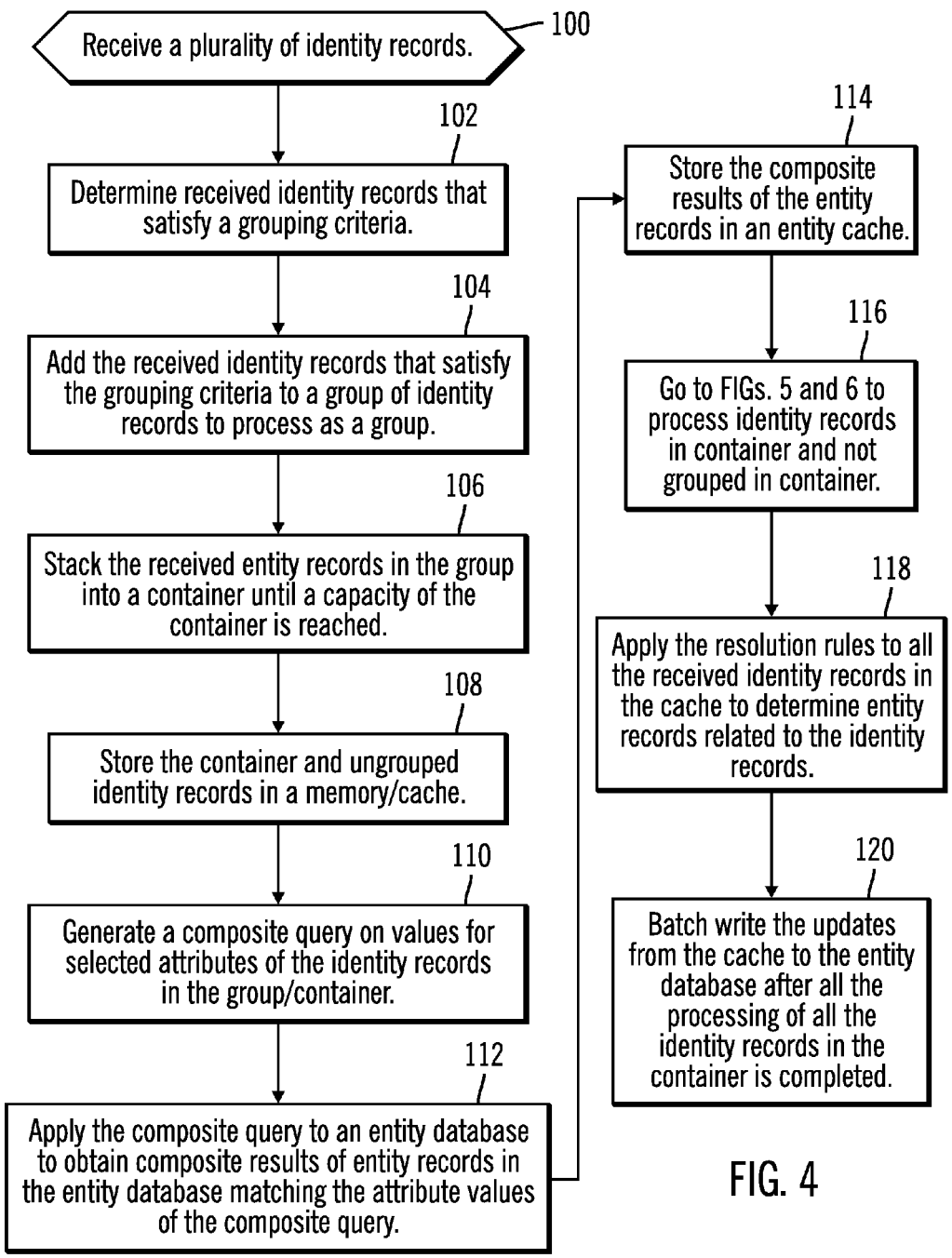
FIGS. 4-6 illustrate an embodiment of operations to perform entity resolution operations on identity records received as input.
Figure 5:
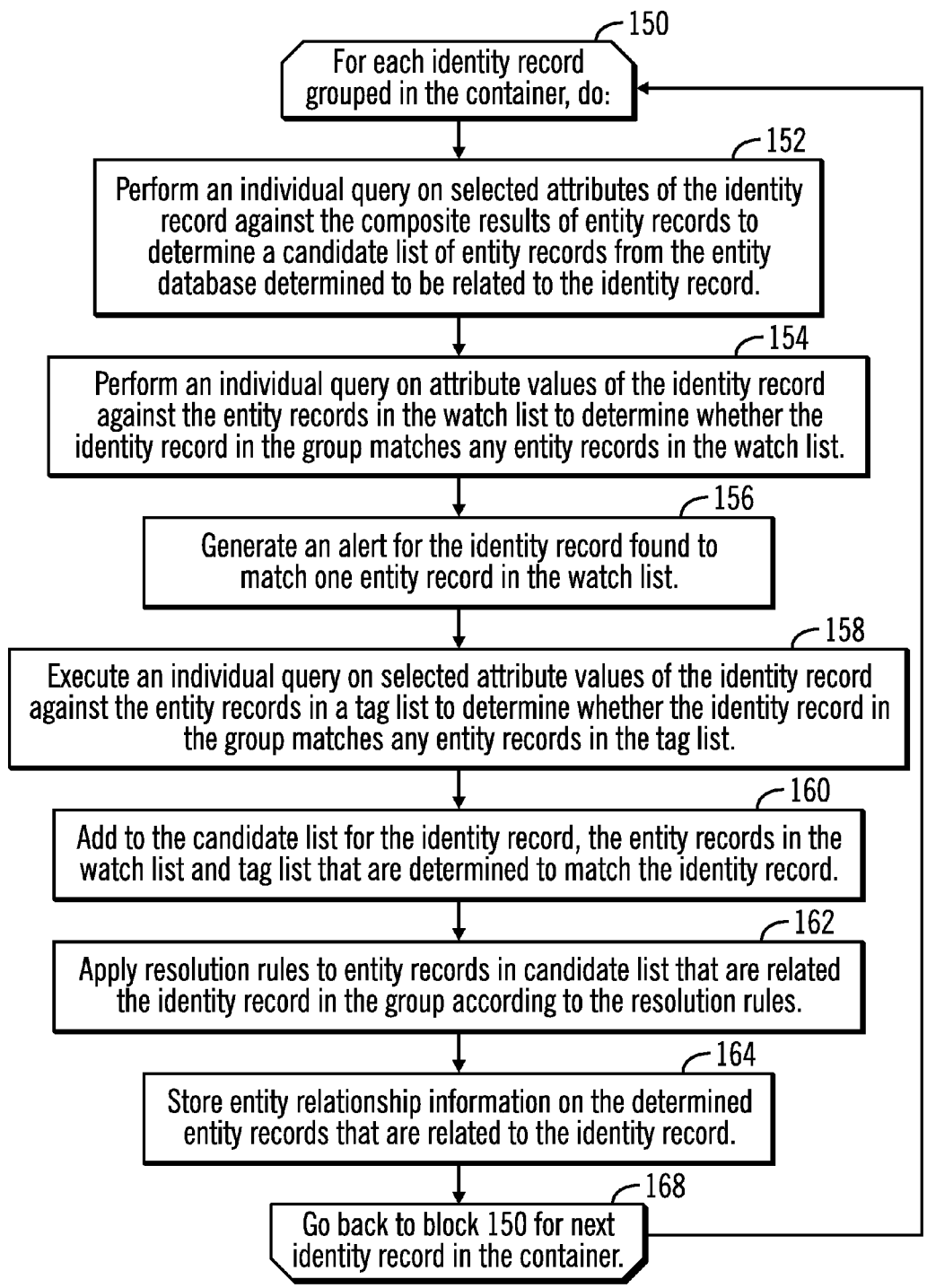
Figure 6:
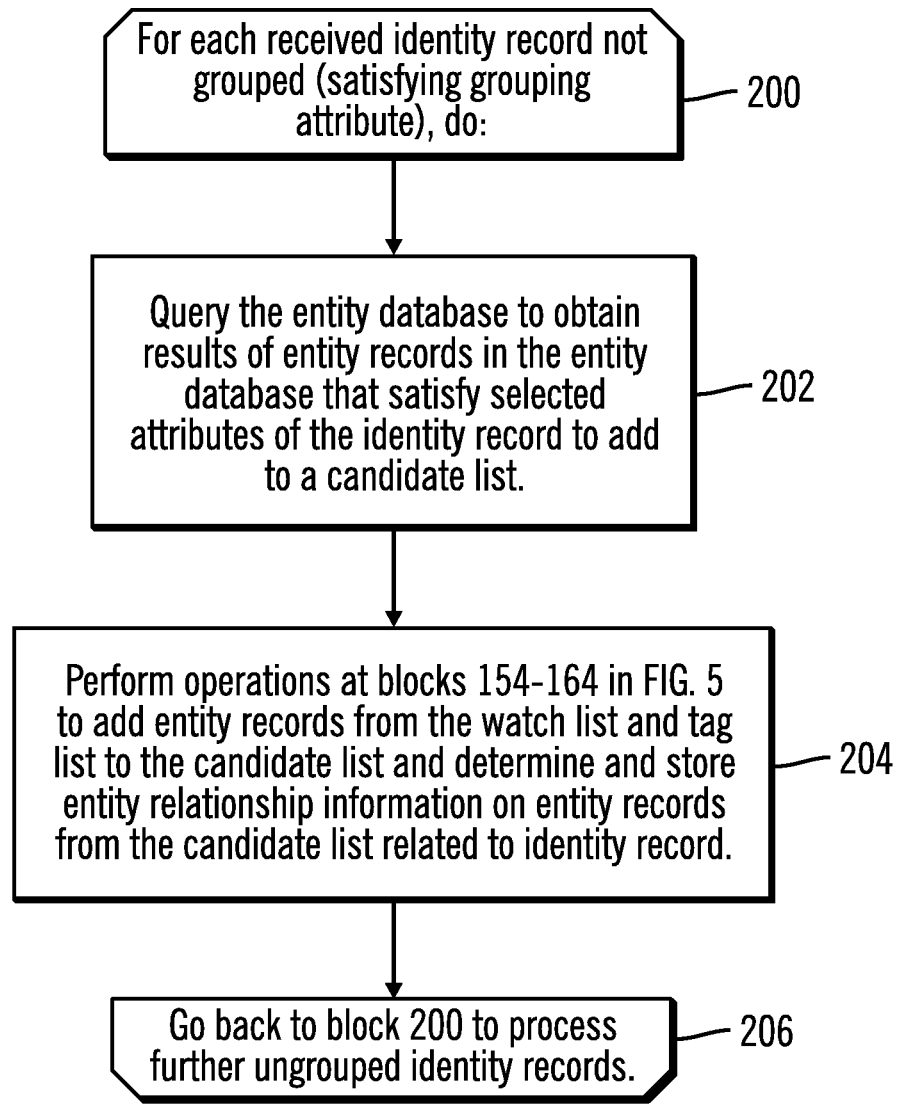

FIGS. 4, 5, and 6 illustrate an embodiment of operations performed by the entity analyzer 8 to process a plurality of received identity records 10 to determine their relationship to entity record in the entity database 18, watch list 26 and/or tag list 30. With respect to FIG. 4, upon receiving (at block 100) a plurality of identity records 10a, 10b . . . 10n, the entity analyzer 8 determines (at block 102) whether the identity records 10a, 10b . . . 10n satisfy a grouping criteria, which comprises a value or range of values for one or more selected attributes 54a . . . 54n of the identity record 10a, 10b . . . 10n that must be satisfied. Identity records 10a, 10b . . . 10n that satisfy the grouping criteria attribute 54a . . . 54n value or criteria are grouped together for batch processing in a container 12. Identity records 10a, 10b . . . 10n that are not grouped according to the grouping criteria may be processed individually. This allows the administrator to select a criteria for batch processing. Alternatively, all received identity records 10a, 10b . . . 10n, without regard to criteria, may be grouped for batch processing.

The identity records 10a, 10b . . . 10n satisfying the grouping criteria are added (at block 104) to a group of identity records to process as a group. In one embodiment, grouping the identity records 10a, 10b . . . 10n to process as a group may involve stacking (at block 106) the received identity records 10a, 10b . . . 10n in the group into a container 12 until a capacity of the container is reached. The container 12 may include the actual identity record 10a, 10b . . . 10n or a pointer to the identity records 10a, 10b . . . 10n. Once the capacity of the container 12 is reached, i.e., a pre-defined maximum number of records, then a new container 12 may be created. In one embodiment, the container 12 stack may be implemented as an in-memory 6 stack when the container 12 size is limited. Alternatively, the container 12 may be implemented as a vector that can expand and contract dynamically. Application programming interfaces (APIs) may be used to push new identity records 10a, 10b . . . 10n onto the container 12 stack or retrieve from the container stack. In a further embodiment, the container 12 may be implemented as an in-memory database for relatively large stack sizes. The container 12 of grouped identity records 10a, 10b . . . 10n and ungrouped identity records 10a, 10b . . . 10n, i.e., identity records not satisfying a grouping criteria, are stored (at block 108) in the memory 6, such as a cache area of the memory 6.

The entity analyzer 8 then generates (at block 110) a composite query 14 on values for selected attributes 54a, 54b . . . 54n of the identity records 10a, 10b . . . 10n in the group/container 12. The composite query 14 may comprise a logical OR of all the selected attribute values of the identity records 10a, 10b . . . 10n grouped in the container 12. The entity analyzer 8 applies (at block 112) the composite query 14 to the entity database 18 to obtain composite results 20 of entity records 22 in the entity database 18 matching the selected attribute values of the composite query 14. The composite results 20 of entity records 22 may be stored (at block 114) in the entity cache 24. Control then proceeds (at block 116) to FIGS. 5 and 6 to process the identity records 10 in the container 12 to determine relationships between the identity records 10 and the candidate list 34 of entity records in the composite results 20, the watch list 26 and/or the tag list 30. The entity analyzer 8 applies (at block 118) the resolution rules 36 to all the received identity records 10 in the cache to determine entity records 22 related to the identity records 10. The updates to the identity records are batch written (at block 120) from the cache to the entity database 18 after all the processing of all the identity records 10 in the container is completed.

FIG. 5 illustrates an embodiment of operations of the entity analyzer 8 to perform bulk entity resolution on the identity records 10*a*, 10*b* . . . 10*n* grouped in the container 12. The entity analyzer performs the operations in blocks 150 through 168 for each identity record 10*a*, 10*b* . . . 10*n* grouped in the container 12. The entity analyzer 8 performs (at block 152) an individual query 16*a*, 16*b* . . . 16*n* on selected attribute values of the identity record 10*a*, 10*b* . . . 10*n* against the composite results of entity records to determine a candidate list 34*a*, 34*b* . . . 34*n* of entity records 22 from the entity database 18 determined to be related to or matching the selected attribute search parameters from the identity record 10*a*, 10*b* . . . 10*n*. The entity analyzer 8 performs (at block 154) an individual query 16*a*, 16*b* . . . 16*n* on selected attribute values of the identity record 10*a*, 10*b* . . . 10*n* against the entity records in a watch list 26 to determine whether the identity record 10*a*, 10*b* . . . 10*n* in the group matches the entity records in the watch according to the selected attributes 54*a* . . . 54*n* of the query 16. If there are entities in the watch list 26 matching the identity record 10*a*, 10*b* . . . 10*n* according to selected attributes 54*a* . . . 54*n* of the identity record 10, then an alert may be generated (at block 156) that an identity record was found that matches one entity record on the watch list to request further follow-up on this result.

The entity analyzer 8 further executes (at block 158) the individual query 16*a*, 16*b* . . . 16*n* on selected attribute values of the identity record 10*a*, 10*b* . . . 10*n* against the entity records in the tag list 30 to determine whether the identity record 10*a*, 10*b* . . . 10*n* in the group matches entity records in the tag list 30. The entity analyzer 8 then adds (at block 160) the matching entity records in the watch list 26 and tag list 30 to the candidate list 34*a*, 34*bb* . . . 34*n* for that identity record 10*a*, 10*b* . . . 10*n*.

In the described embodiment of FIG. 5, the entity analyzer 8 processes the watch list 26 and tag list 30 in addition to the entity database 18. In alternative embodiments, the entity analyzer 8 may only look for matching entity records in the entity database 18 and not consider a watch list 26 or tag list 30. Yet further, the entity analyzer 8 may consider additional in-memory lists. In certain embodiments, for ungrouped identity records 10*a*, 10*b* . . . 10*n*, the entity analyzer 8 may apply the same individual query 16*a*, 16*b* . . . 16*n* against the entity database 18 and the lists 26 and 30. In alternative embodiments, the entity analyzer 8 may user different individual queries based on the identity record attribute values for the database 18 and the different lists 26 and 30.

After generating the candidate list 34*a*, 34*b* . . . 34*n* for the identity record 10*a*, 10*b* . . . 10*n* being considered, the entity analyzer 8 applies (at block 162) resolution rules 36 to the entity records in candidate list 34*a*, 34*b* . . . 34*n* for the identity record 10*a*, 10*b* . . . 10*n* to determine those entity records that are related to the identity record 10 according to the resolution rules 36. The entity analyzer 8 further stores (at block 164) information on the determined entity records in the entity cache 24, watch list 26, and tag list 30 that are related to the identity record 10*a*, 10*b* . . . 10*n* in the entity relationship information 38*a*, 38*b* . . . 38*n* for that identity record 10*a*, 10*b* . . . 10*n*.

FIG. 6 illustrates an embodiment of operations the entity analyzer 8 performs for received identity records, e.g., 10*a*, 10*b* . . . 10*n*, that are not added to a container 12, such as identity records that do not satisfy the grouping attributes for the container 12, or those identity records that are not processed in batch as a group, but instead processed on a record-by-record basis. The entity analyzer 8 performs a loop of operations at blocks 200 through 206 for each ungrouped identity record 10*a*, 10*b* . . . 10*n*. At block 202, the entity analyzer 8 queries the entity database 18 using an individual query 16*a*, 16*b* . . . 16*n* based on selected attributes 54*a* . . . 54*n* of the identity record 10*a*, 10*b* . . . 10*n* to obtain results of entity records in the entity database 18 that satisfy the selected attributes 54*a* . . . 54*n* of the identity record 10*a*, 10*b* . . . 10*n* to add to the candidate list 34*a*, 34*b* . . . 34*n* of the identity record 10*a*, 10*b* . . . 10*n*. The equity analyzer 8 performs (at block 204) operations at blocks 154-164 in FIG. 5 to add entity records from the watch list 26 and tag list 30 to the candidate list 34*a*, 34*b* . . . 34*n* and generate and store entity relationship information 38*a*, 38*b* . . . 3*n* on entity records from the candidate list 34*a*, 34*b* . . . 34*n* related to the processed ungrouped identity record 10*a*, 10*b* . . . 10*n*

In certain embodiments, the entity analyzer 8 may invoke multiple parallel threads to separately query the entity cache 24, the watch list 26 and the tag list 30 to identify entity records having attributes matching those of the identity record to add to the candidate list 34*a*, 34*b* . . . 34*n*. After the candidate 4 list 34*a*, 34*b* . . . 34*n* is generated for one identity record 10*a*, 10*b* . . . 10*n* using such multiple threads to improve processing performance, the resolution operation can be performed for that candidate list 34*a*, 34*b* . . . 34*n* and identity record 10*a*, 10*b* . . . 10*n*.

Because of the ingestion of the identity record 10*a*, 10*b* . . . 10*n*, a new entity record for the entity database 18 may be needed to be created or the attributes of the identity record 10*a*, 10*b* . . . 10*n* may be merged into any existing entity record. In certain embodiments, updates to the state of any entity record or other data are logged to the cache instead of the entity database 18. The data in the entity cache 24, including new and updated entity records 22 and entity relationship information 38*a*, 38*b* . . . 38*n*, may then be written to the entity database 18. A batch update method may be employed to update the entity database 18 with all the entity records 22 and entity relationship information 38*a*, 38*b* . . . 38*n* in a single batch commit operation. If the entity cache 24 is runs out of available space in the memory 6, then some of the entity records 22 in the entity cache 24 may be evicted to make space for new entity records.

Cache management schemes, such as MRU (Most recently used) and LRU (Least recently used) methods may be used to remove entity records 22 from the entity cache 24 to the entity database 18. For MRU entity retention, those entity records 22 in the entity cache 24 which have been used recently are retained in the cache and older entity records 22 are destaged to the entity database 18 to make space for the new entity records. In order to keep track of the number of times a particular entity record has been used in the entity resolution process, each of the entity records 22 in the entity cache 24 may be assigned a score based on the number of times it took part in the entity resolution process. This score can be based on a simple counter parameter which is incremented for each time when the particular entity took part in the resolution process and those entities which have the least score will be the ones that will be marked for eviction. For the LRU entity eviction scheme, the entity records 22 in the entity cache are time stamped when the entity record 22 was last used in the resolution process, e.g., added to a candidate list 34*a*, 34*b* . . . 34*n*. Using this time-stamp parameter, scores are assigned for each entity based on the difference in the current time and the value specified in the time stamp. This difference will be the highest for that entity record 22 which was least recently used. The scores are assigned proportionally to these values of the differences and those entities which have the highest score will be the ones that will be marked for eviction.

In certain embodiments, the identity records 10a, 10b . . . 10n may need to be converted into a structured document, such as a Universal Messaging Format (UMF), which is Extended Markup Language (XML) based. The document contains standard tags that represent key pieces of identities, relationships, and activities. UMF document implementations may consist of these hierarchical components. A UMF document is a collection of UMF segments that structure the data and indicate the type of data source record. UMF Segments are the part of the UMF document that structures the data for the data source. UMF elements are XML tags and values that define the data within a UMF segment of a UMF document.

Figure 7:
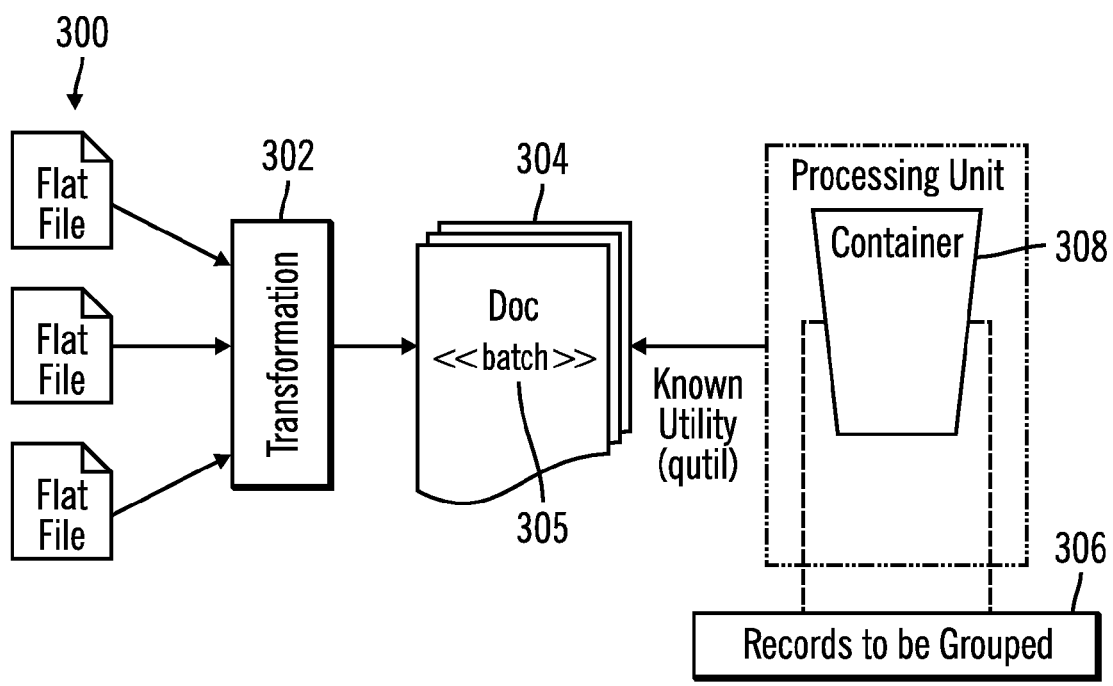
FIG. 7 illustrates an embodiment of a system to process received identity records for batch processing.

FIG. 7 illustrates an embodiment for batch processing of input identity records. The identity records 300 may comprise records in flat files and the flat files are transformed 302 into a structured document 304. For a batch load scenario, the document 304 may include a special element which specifies that the incoming data is to be batch processed, such as a batch tag, e.g., <<batch>>. For instance, a document tag 305 may indicate that a large amount of data will follow. Upon detecting a batch tag 305 in the document 304, the entity analyzer 8 may then check a value of a variable called RECORDS_TO_BE_GROUPED 306 in a batch processing file having information for batch processing. This value indicates the number of records to be grouped in a container 308. This implementation can be further extended to initial load scenarios where large amounts of data needs to be fed into the entity database 18 in production environments. In initial load scenarios, the input data is in the form of a flat file 300. The single flat file 300 may then be transformed into a structured document 304 input to the entity resolution engine. Each record from the document 304 may be placed in a Bulk Dispatcher (container 308). When the number of records from the document 304 in the container 308 reaches the records to be grouped value 306, the process of entity resolution is triggered and all the records in the container 308 are fed into the entity analyzer 8 to perform the resolution process using the candidate list discussed above.

For example, if there are 1000 records in the flat file 300, and if the container 308 threshold value (records to be grouped 306) is 25 records, then document 304 records are being continuously read into the container until the capacity of 25 is reached. Then all these 25 records will be submitted to the entity analyzer 8 altogether. The new scheme of candidate list generation will generate the list of candidates to all these 25 records and will cache it in the entity cache 24. The entity resolution is performed for each of the 25 records using the data in the cache. In further embodiments, a multi threaded file reader may be provided to read numerous flat files 300. The input flat file 300 may be broken into smaller chunks and each one of these chunks can be read by a separate thread of the file reader rather than reading the records one-by-one by a single thread. Each of the multiple file reading threads will read the data from the flat file and push them into the container. After the container capacity is fulfilled, these records are being pushed into the processing engine.

Described embodiments provide techniques for generating candidate lists for input identity records by grouping identity records and generating a composite query for the entity database to return entity records to consider including in the candidate list for the grouped identity record. The candidate list for the identity record may then be subject to resolution rules to determine entity records in the candidate list related to the identity record. Described embodiments group input identity records to process in bulk during the resolution process to improve entity resolution performance.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, interconnected storage devices, an array of storage devices, multiple memory or storage devices or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the system of FIG. 1 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the system of FIG. 1 may provide clients, and other servers and software and/or hardware components in the networked cloud, with scheduling services.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product for entity resolution, the computer program product comprising a computer readable storage medium having computer readable program code embodied therein that executes to communicate with an entity database and perform operations, the operations comprising:
receiving a plurality of identity records, wherein the identity records provide attributes of entities, wherein the identity records may provide different or same values for the attributes;
grouping the received identity records into a group of identity records;
generating a composite query on values for selected attributes of the identity records in the group;

applying the composite query to the entity database to obtain composite results of entity records in the entity database matching the attribute values of the composite query;

for the identity records in the group, performing an individual query on attributes of one of the identity records against the composite results of the entity records to determine a candidate list of the entity records from the entity database for the identity record;

for the identity records in the group, applying resolution rules to determine the entity records in the determined candidate list that are related to one of the identity records in the group according to the resolution rules; and storing entity relationship information on the determined entity records that are related to the identity records.

2. The computer program product of claim 1, wherein the operations further comprise:

for the identity records in the group, performing an individual query on attributes of the identity records against the entity records in a watch list to determine whether the identity records in the group match the entity records in the watch list; and generating an alert for the identity records in the group found to match one of the entity records in the watch list.

3. The computer program product of claim 2, wherein the operations further comprise:

adding to the candidate list for one of the identity records in the group the entity records in the watch list that are determined to match the identity record, wherein the resolution rules are applied to the candidate list including the entity records from the composite results from the entity database and the determined related entity records from the watch list.

4. The computer program product of claim 2, wherein the operations further comprise:

for the identity records in the group, performing an individual query on attributes of the identity records against the entity records in a tag list to determine whether the identity records in the group match the entity records in the tag list; and adding to the candidate list for one of the identity records in the group, the entity records in the watch list and the tag list that are determined to be related to the identity record, wherein the resolution rules are applied to the candidate list including the entity records from the composite results from the entity database and the determined related entity records from the watch list and the tag list.

5. The computer program product of claim 4, wherein the operations further comprise:

storing the composite results of the entity records in an entity cache;

storing the watch list in a watch list cache;

storing the tag list in a tag list cache; and using multiple threads to perform the individual queries on attributes of the identity records against the composite results of the entity records in the entity cache, the watch list in the watch list cache, and the tag list in the tag list cache, wherein access to the cache is faster than access to the entity database.

6. The computer program product of claim 1, wherein the operations further comprise:

storing the composite results of the entity records in a cache, wherein the individual queries on attributes of the identity record against the composite results of the entity records are performed on the entity records in the cache, wherein access to the cache is faster than access to the entity database.

7. The computer program product of claim 1, wherein the operations further comprise:

determining the received identity records that satisfy a grouping attribute, wherein the received identity records that satisfy the grouping attributes are included in the group to process; and for each of the identity records not satisfying the grouping attribute:

query the entity database to obtain results of the entity records in the entity database that satisfy the attributes of the identity record;

apply resolution rules to determine the entity records satisfying the query that are related to the identity record according to the resolution rules; and store entity relationship information on the determined entity records that are related to the identity record.

8. The computer program product of claim 1, wherein grouping the received entity records into a group comprises:

stacking the received entity records into a container until a capacity of the container is reached;

caching the received identity records in the container in a cache; and batch writing the identity records in the container in the cache to the entity database in response to applying the resolution rules to all the received identity records in the cache to determine the entity records related to the identity records.

9. The computer program product of claim 1, wherein the operations further comprise:

storing in an entity cache the entity records obtained by querying the entity database;

scoring the entity records in the entity cache by a number of times the entity records are used in candidate lists for the identity records; and evicting the entity records from the entity cache to make space for new entity records based on the scoring of the entity records.

10. A system in communication with an entity database, comprising:

a processor; and a computer readable storage medium including a program executed by the processor to perform operations, the operations comprising:

receiving a plurality of identity records, wherein the identity records provide attributes of entities, wherein the identity records may provide different or same values for the attributes;

grouping the received identity records into a group of identity records;

generating a composite query on values for selected attributes of the identity records in the group;

applying the composite query to the entity database to obtain composite results of entity records in the entity database matching the attribute values of the composite query;

for the identity records in the group, performing an individual query on attributes of one of the identity records against the composite results of the entity records to determine a candidate list of the entity records from the entity database for the identity record;

for the identity records in the group, applying resolution rules to determine the entity records in the determined candidate list that are related to one of the identity records in the group according to the resolution rules; and storing entity relationship information on the determined entity records that are related to the identity records.

11. The system of claim 10, wherein the operations further comprise:

for the identity records in the group, performing an individual query on attributes of the identity records against the entity records in a watch list to determine whether the identity records in the group match the entity records in the watch list; and generating an alert for the identity records in the group found to match one of the entity records in the watch list.

12. The system of claim 11, wherein the operations further comprise:

adding to the candidate list for one of the identity records in the group the entity records in the watch list that are determined to match the identity record, wherein the resolution rules are applied to the candidate list including the entity records from the composite results from the entity database and the determined related entity records from the watch list.

13. The system of claim 11, wherein the operations further comprise:

for the identity records in the group, performing an individual query on attributes of the identity records against the entity records in a tag list to determine whether the identity records in the group match the entity records in the tag list; and adding to the candidate list for one of the identity records in the group, the entity records in the watch list and the tag list that are determined to be related to the identity record, wherein the resolution rules are applied to the candidate list including the entity records from the composite results from the entity database and the determined related entity records from the watch list and the tag list.

14. The system of claim 13, further comprising:

storing the composite results of the entity records in an entity cache in the computer readable storage medium;

storing the watch list in a watch list cache in the computer readable storage medium;

storing the tag list in a tag list cache in the computer readable storage medium; and using multiple threads to perform the individual queries on attributes of the identity records against the composite results of the entity records in the entity cache, the watch list in the watch list cache, and the tag list in the tag list cache, wherein access to the cache is faster than access to the entity database.

15. The system of claim 10, wherein the operations further comprise:

determining the received identity records that satisfy a grouping attribute, wherein the received identity records that satisfy the grouping attributes are included in the group to process; and for each of the identity records not satisfying the grouping attribute:

query the entity database to obtain results of the entity records in the entity database that satisfy the attributes of the identity record;

apply resolution rules to determine the entity records satisfying the query that are related to the identity record according to the resolution rules; and store entity relationship information on the determined entity records that are related to the identity record.

16. The system of claim 10, wherein grouping the received entity records into a group comprises:

stacking the received entity records into a container in the computer readable storage medium until a capacity of the container is reached; and caching the received identity records in the container in a cache in the computer readable storage medium; and batch writing the identity records in the container in the cache to the entity database in response to applying the resolution rules to all the received identity records in the cache to determine the entity records related to the identity records.

17. The system of claim 10, further comprising:

storing in an entity cache in the computer readable storage medium the entity records obtained by querying the entity database;

scoring the entity records in the entity cache by a number of times the entity records are used in candidate lists for the identity records; and evicting the entity records from the entity cache to make space for new entity records based on the scoring of the entity records.

* * * * *